July 26, 1966   E. D. ELLIS   3,262,787
PROCESS OF PREPARING PACKAGED COOKED FOODS
Filed June 18, 1962   3 Sheets-Sheet 1

EUGENE D. ELLIS   INVENTOR

BY Ernest V. Haines

ATTORNEY

July 26, 1966   E. D. ELLIS   3,262,787
PROCESS OF PREPARING PACKAGED COOKED FOODS
Filed June 18, 1962   3 Sheets-Sheet 2

EUGENE D. ELLIS   INVENTOR

BY *Ernest V. Haines*

ATTORNEY

July 26, 1966  E. D. ELLIS  3,262,787
PROCESS OF PREPARING PACKAGED COOKED FOODS
Filed June 18, 1962  3 Sheets-Sheet 3

EUGENE D. ELLIS  INVENTOR

BY *Ernest V. Haines*

ATTORNEY

United States Patent Office 3,262,787
Patented July 26, 1966

3,262,787
PROCESS OF PREPARING PACKAGED
COOKED FOODS
Eugene D. Ellis, 3120 NW. 13th Ave., Miami, Fla.
Filed June 18, 1962, Ser. No. 203,049
11 Claims. (Cl. 99—174)

The present invention relates to packaged cooked foods and to the processes of preparing such foods. More particularly, the invention relates to sterile, cooked, succulent, packaged, fleshy foods which are substantially devoid of unabsorbed juices and liquids normally associated with and which arise in segregated conditions by reason of the cooking process.

Heretofore, numerous cooking methods have been attempted in the preparation and marketing of the so-called "Brown and Serve" and precooked foods, but as yet no method devised has been able to fully or substantially fully preserve the succulence, flavor and aroma of the cooked product when that product has been precooked or partially precooked, and perhaps frozen, for any considerable length of time prior to that at which the product is consumed by the ultimate user. Conventional cooking of meats, poultry, fish and other seafoods has always resulted in substantial flavor and aroma losses, as well as loss of nutrient bearing juices within a few hours following the cooking operation and such disadvantages are particularly apparent where large quantities of precooked foods are prepared for wholesale distributions, either in the frozen or unfrozen state. Additionally, heretofore, such foods generally do not retain what visual and taste appeal they originally possessed for very long periods of time because they are not distributed in an absolutely sterile condition having been for the most part cooked either completely or partially and thereafter packaged in a separate operation. Such separate packaging operations give rise to the distinct likelihood of some bacterial contamination which in turn affords a greater chance that the product distributed will be a complete loss due to bacterial spoilage, especially so if a matter of several months elapses between initial packaging and ultimate intended consumption.

The foregoing disadvantages are overcome in the cooking of fleshy foods through the use of a novel combination of processing steps. The term "fleshy food" as employed herein and in the accompanying claims, is intended to include various types of edible proteinaceous tissue or flesh of animals customarily cooked and prepared for human consumption, including poultry, or other fowl, wild or domestic, such as chicken, duck, geese, turkey, game birds, meats, such as beef, lamb, pork, veal, corned beef, seafoods, such as shrimp, scallops, lobster, salt and fresh water fish, as well as game animal tissues such as venison, elk, bear, rabbit, and the like.

An uncooked proteinaceous food such as the muscle tissue of animals, seafoods, or poultry is first made ready for cooking. The particular roast, filet, or food to be cooked may be initially injected, for example, stitched with an aqueous solution of water, a mono alkali metal salt of glutamic acid to enhance the natural flavor, for example, monosodium or monopotassium glutamate, and a gelling agent to fix or retain in place the glutamic acid salt and nutrient and flavor rich juices. Such stitching or injection is a preferred operation, but it is optional. The present invention can also be carried out without resorting to such stitching.

Gelatin is the preferred gelling agent employed. However, other gelling agents that are effective for use in stitching the monosodium glutamate or its related alkali metal salts into the fleshly uncooked food are agar-agar, Irish moss, carbo bean gum, albumin, and the like. From about 0.75% to about 3.0% by weight of gelling agent in water solutions and from about 3.0 to about 8.0% by weight of monosodium glutamate or monopotassium glutamate in the same solution is employed. The total amount of such solution in aliquots is stitched in a plurality of spots throughout the fowl, meat chunk, fish, etc. to obtain good distribution. The total amount of solution used ranges between about 2.5 and about 10.0% by weight of the weight of the food being stitched. My Patent 2,687,961, of August 31, 1954, discloses this stitching solution, the amounts and manner of its use as applied to poultry and its disclosure is incorporated herein by reference. A specific and typical aqueous stitching solution consists of 1.25 oz. of gelatin, 4 oz. of monosodium glutamate and 42.5 oz. of water and is stitched intramuscularly to a total level of about 3% by weight of the food being processed. The addition of this solution to the product in the package (hereinafter described) without stitching, is practical but less effective.

The usual seasoning such as salt, pepper, garlic, etc. are also used in conventional manner, such as by rubbing the same on the surfaces of the food prior to initial packaging and cooking.

Following the injection of this solution, the food is either wrapped with, or placed in a bag of, a thermoplastic of sheeting thickness, i.e. of a thickness conventionally employed in making thermoplastic sheeting for wrapping articles. Such materials should be inert with respect to the food products being processed so that off flavors are not imparted to the food at any stage in the processing and at the same time the food juices and solids do not attack or disintegrate the plastic bag or wrapping materials. Additionally, the plastic material employed must be impervious to air and liquids, while at the same time being stable to, and remain pliable at, the elevated temperatures encountered during the cooking operation and the low temperatures encountered in freezing operations and frozen storage. As a preferred embodiment of the novel process hereindescribed, a plastic film or sheeting, in the form of a bag or wrapper, is employed which is capable of being shrunk so that once the fleshly food being processed is placed in the bag or wrapper, the covering can tightly encase the food. Such shrinkage desirably gives a skin-tight fit. Also, and preferably, the plastic should be of such a character as to be readily sealable by a convenient means, such as by application of heat, by twisting tightly, by clipping tightly with mechanical pressure or by metal clips, rubber bands, wire, etc., or by other conventional means. Transparent plastic materials are advantageously employed, since the marketability and salability of the cooked products displayed therein is considerably enhanced.

The plastic wrapper or bags are made usually from plastic sheetings. Examples of suitable plastics used are the polymers and copolymers, representative of which are the following: Polyvinylidene chloride, Saran, which is a vinylidene chloride-vinyl chloride copolymer; Cryovac, the copolymer of vinylidene chloride with acrylonitrile, shrinkable polyesters formed from the condensation of polyols, such as ethylene glycol with dibasic carboxylic acids and their anhydrides, such as maleic anhydride, terephthalic acid (Mylar), polyethylene, polypropylene, the plastic copolymer of ethylene with propylene, polyvinyl chloride, polyvinyl acetate, polyvinyl butyrals, and the like.

The shape or construction of the wrapper or bag encasing the food item being processed is important. Although the plastic need not fit the food skin-tight, such a condition is desirable. The plastic covering, however, must contain an opening and, in addition, and apart from the main chamber housing the food to be cooked, an additional chamber or sack in open and direct communication with the main chamber must be present. Although the opening and the auxiliary chamber can be two separate and independent parts connected to the main food containing chamber (FIGURE 8, ante) usually, and more conveniently, the opening is part of the auxiliary chamber which in turn is connected directly to, and in open connection with, the main chamber, so that an elongated neck type of chamber which may be part of the plastic bag containing the food serves in that capacity. No particular size or shape for the auxiliary chamber is required. All that is necessary is that its volume be sufficient to hold all of the unabsorbed juices and other liquids that are present after the meat has been cooked and chilled as hereinafter described. If a plastic bag is employed as the wrapper, the food may be placed in the bottom or as far removed from the opening as possible. Alternatively, the food may be placed in the center or close to the opening of the bag with the bottom of the bag then serving as the auxiliary juice collecting chamber. At any event, the interior area of the bag not occupied by the food, and regardless of its potential volume, diameter, length, etc., serves ultimately as the juice and liquid collecting chamber.

Once the uncooked food, preferably stitched as above described, is placed within the plastic container or wrapped with plastic so as to have an opening and a juice collecting chamber, a vacuum is applied regardless of whether or not the plastic has been shrunk before the vacuum is applied through the opening. The removal of air is highly desirable. The amount of void within the plastic container from a practical standpoint is not sufficiently low to be able to omit this vacuuming step. The bag or wrapper is then initially hermetically sealed at the opening while under vacuum. Any air remaining therein will expand during the cooking operation, so much so that the plastic casing may rupture if sizable amounts of air are not first removed by vacuuming before proceeding with the cooking. A small residual amount of air does not interfere with the subsequent cooking operation, hence no great care needs to be exercised to remove these residual quantities of air.

After initial sealing of the opening, the fleshy food is subjected to the cooking operation which may be accomplished by means of hot air, steam, hot water, radiant heating, or any other conventional means. The degree of cooking depends upon whether partial or complete cooking is desired. In either case, temperatures employed and times required vary considerably, depending upon the type of flesh being cooked. Conventional temperatures and times are employed. For example, for completely cooking a beef roast, a temperature of about 160° F. for one hour per pound is sufficient. For shrimp, fish, or scallops completely cooked, a temperature of about 180° F. for 35 minutes per pound suffices.

In order to preserve the succulence of the cooked food, immediately upon completion of the cooking, the wrapped or encased food is chilled by immersing it in water-ice slurry or bath, maintained at a temperature of between about 33 and about 40° F. for a sufficient length of time for all portions of the food to reach a temperature within that range. Such procedure, surprisingly, results in the cooked meat, seafood or poultry reabsorbing a substantial amount of the juices and liquids which "cooked out" of the food during the cooking operation.

Not all of such juices and liquids will reabsorb, however. The unabsorbed liquids contain much of the flavor and aroma associated with cooked fleshy foods and desirably are separately gathered for future use, either when the cooked meat is warmed and eaten or for use in making gravies, sauces, and the like. The novel process of my invention makes possible the saving, separate packaging, and the collective or separate marketing of the cooked food and the unabsorbed liquids, both packages retaining their sterile contents in sterile condition and no package film encasement being reopened or opened at any time after completion of the cooking.

Further understanding of the novel process is more readily to be accomplished by reference to the accompanying drawings, which are, to a large extent, diagrammatic representations of the processing steps involved.

Figure 1:
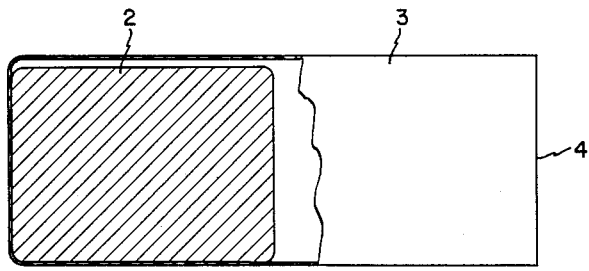
FIGURE 1 is a partial sectional elevation of, for example, an uncooked chuck of beef, placed in a suitable plastic bag, for example, a Cryovac bag.

Referring now, in detail, to the drawings, the same numerals being used to designate the same items in the various figures, in FIGURE 1, a chuck of beef 2, for example, which has been stitched desirably with an aqueous stitching liquid containing water, monosodium glutamate and gelatin (not shown), is placed in a plastic bag 3 of polyvinylidene chloride sheeting (shrinkable type) by means of the opening 4.

Figure 2:
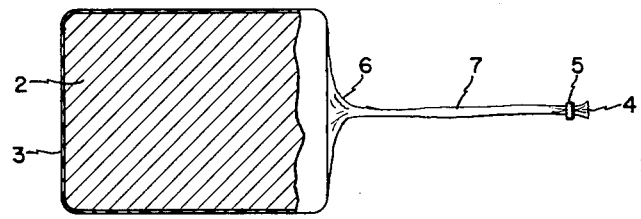
FIGURE 2 depicts the same beef as in FIGURE 1 after the plastic bag has been shrunk, the air removed by vacuum and the opening hermetically sealed with a clip.

In FIGURE 2 the bag 3 has been shrunk, by application of hot water and cooling, to tightly fit over the beef 2 and to form the elongated neck 7 having juncture 6 in direct and open communication with the main chamber containing beef 2. The bag is then subjected to a vacuum to withdraw a major amount of the air present in the bag and opening 4 while the bag 3 was under vacuum and was hermetically sealed with a permanent sealing clip 5.

Figure 3:
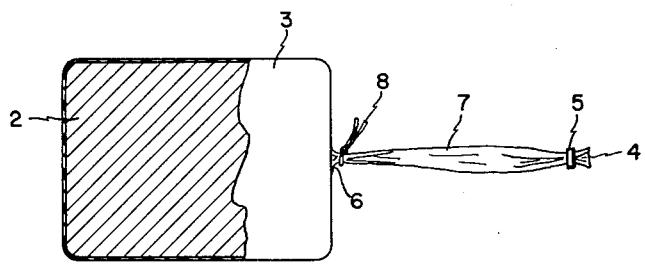
FIGURE 3 shows the same as FIGURE 2, except that a temporary clip, which does not permanently seal the bag at that point, has been placed on the elongated auxiliary chamber at the juncture of that chamber with the main chamber preparatory to cooking the beef.

FIGURE 3, as before stated, shows much the same as FIGURE 2, except that a temporary removable clip fastener 8, usually a plastic coated bendable wire, has been fastened to elongate chamber 7 near its juncture 6 with the main beef containing chamber to aid in maintaining the shape of the chuck of beef and to confine the juices and liquids released during the cooking step, in close proximity to the beef, while chilling the beef after its cooking has been completed. Clip 8 does not form a permanent seal of the bag at this point. Optionally, temporary wire clip 8 may not be employed at all, but if this option is followed, it may be desirable to insure that the liquids and juices flow by gravity down and around the beef surfaces during the chilling operation by keeping the auxiliary chamber or neck 7 uppermost and the beef 2 lowermost when the package is immersed in the ice-water slurry and bath. Also, clip 8 may be applied just before, simultaneously with, or just after permanent clip 5 has been affixed.

Figure 4:
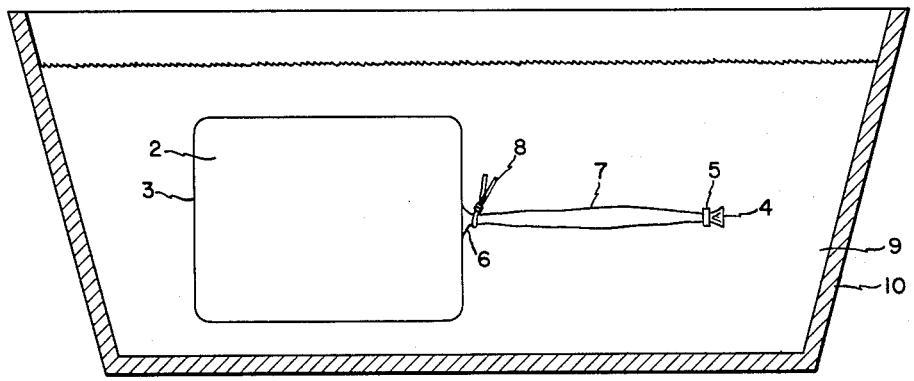
FIGURE 4 shows the food article of FIGURE 3 placed in hot water for cooking.

The prepared, packaged and sealed product, as shown in FIGURE 3, is ready for cooking and is cooked by any suitable conventional means, the particular means shown herein (FIGURE 4) being a boiler or vat 10 containing hot water 9 maintained at a temperature of about 160° F. The cooking time at this temperature for complete cooking is about 1 hour per pound of unstitched beef being cooked. Immediately following the completion of cooking, the packaged cooked beef is placed in an ice-water slurry bath (not shown) to facilitate the reabsorption of a portion of the juices and liquids associated with, and released during, the cooking process. Much of the aroma and flavor of freshly cooked meat, poultry and seafood is contained in these associated liquids and to preserve such values for use either separately or with the freshly cooked food when it is consumed is a primary object achieved by following the process of this invention.

Figure 5:
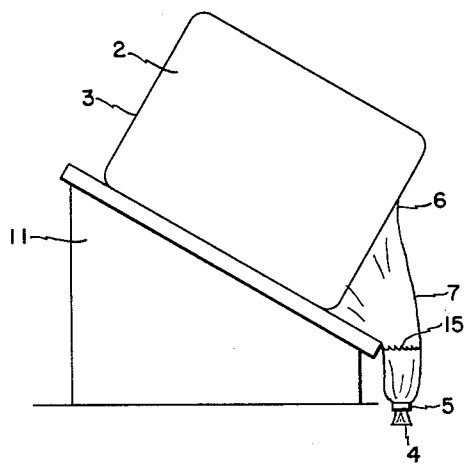
FIGURE 5 shows the beef after completion of cooking and after chilling, and with the temporary clip removed, and placed on a support to allow the unabsorbed juices and liquids to drain by gravity into the elongated chamber.

Once the cooked beef has reached a temperature equilibrium, or substantially so, with the ice-water slurry temperature, the processed package is removed from the ice-water slurry and, removable or temporary clip 18 likewise removed. The package is then placed on a gravity drain shelf 11 with the elongated auxiliary chamber or neck 7 downward and the beef 2 placed uppermost as shown in FIGURE 5. The unabsorbed juices and liquids collect in the chamber or space 7 with the capacity of chamber 7 being sufficient so that all of the said liquids upon collection therein will be at a level 15 which is below juncture point 6.

Figure 6:
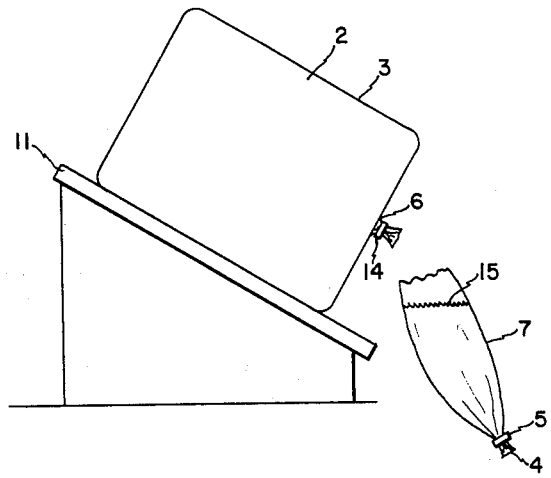
FIGURE 6 shows the same features as FIGURE 5, except that the temporary clip has been replaced by a permanent hermetic seal and the excess liquids removed for immediate use by severing the elongated chamber from the main chamber.

While in the gravity flowing position for the liquids as shown in FIGURE 5 and after all drainable liquid has been collected in chamber 7, a hermetic seal 14 is applied to chamber 7 at a point intermediate liquid level 15 and neck juncture 6, as shown in FIGURE 6. Chamber 7 is then severed at some point between seal or clip 5 and newly applied seal or clip 14 and the juices and liquids collected for immediate and/or separate use not connected with the ultimate time or place of consumption of the cooked, sterile packaged beef 2.

Figure 7:
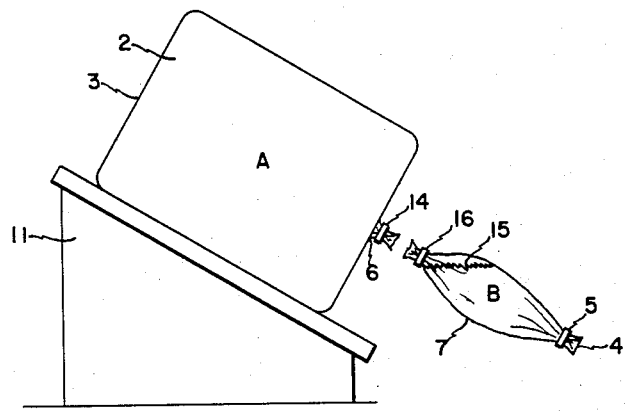
FIGURE 7 shows an optional processing technique involving a third hermetic seal so that the unabsorbed juices and liquids also are hermetically sealed and remain sterile and are in a separate package severed from the main sterile beef package.

Optionally, and in many instances, preferably, as shown in FIGURE 7, while the cooked, packaged beef is in the gravity draining position shown in FIGURE 5, a second additional hermetic or clip seal 16, i.e. additional to seal 14, is applied at a point between the point of clip or seal 14 and the liquid level 15 and the two hermetically sealed packages A and B are separated by knife, scissors, or other conventional means by cutting completely in two sections at any point between clips or seals 14 and 16. In this manner, package A may be marketed on a drained weight basis, yet package B of liquid concentrate may be included as part of the sales price of package A and included as part of the sale of package A, but not necessarily sold on a weight basis.

Figure 8:
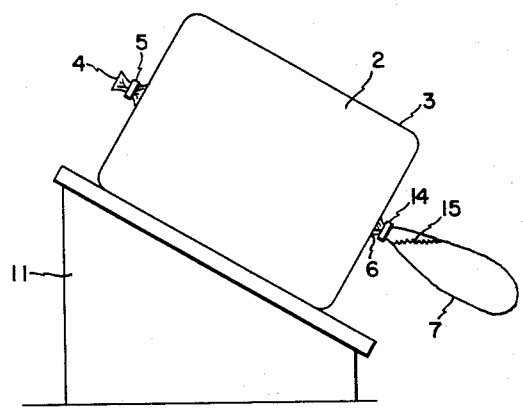
FIGURE 8 shows an optional technique in which the beef is placed close to the initial permanent seal of the bag opening and the far end or bottom of the bag serves as the auxiliary liquid collecting chamber.

FIGURES 1–7 have illustrated an instance wherein the fleshy food to be processed was placed as far as possible into plastic bag 3. FIGURE 8 shows an optional modification comparable to FIGURE 6, except that chamber 7 is not shown in severed condition, but wherein the beef 2 was placed in the bag 3 near the opening 4, and the temporary clip seal 8, its permanent hermetic seal replacement 14, and chamber 7 are located at the opposite end (bottom) of bag 3 from opening 4 and not adjacent to it. Likewise, in this modification, the use of two additional seals 14 and 16 (16 not being shown), as in FIGURE 7, is also contemplated for the same purposes and advantages as set forth in connection with the description and explanation of FIGURE 7.

*Example I*

Seven pieces of frozen top round of beef (pot roast), each weighing a little over 8 lbs. were thawed to give a total weight of about 58 lbs. A warm solution, consisting of 1.25 oz. of gelatin, 4 oz. of monosodium glutamate and 42.5 fluid oz. of water was stitched intramuscularly in a plurality of places in the beef to a total weight of about 3% by wt., based on the weight of the beef. Salt, pepper and garlic were rubbed on the surface to taste. Each piece of meat was then placed in a plastic bag, air removed by applying vacuum, sealed near its opening and the bag shrunk by heating and cooling, using hot water or steam followed by chilling with water. The metal clip near the opening of the twisted neck of each bag was hermetically sealed and a plastic covered soft wire closure which served as a temporary clip was applied near the juncture of the twisted neck with the main chamber of each bag containing the meat. These processed packages were then placed in a tank of hot water maintained at 160° F. for about 8 hours, i.e. one hour per each pound of meat per piece, following which the cooked packaged beef was immediately placed in an ice-water slurry until the meat internal temperature was about 35° F. The packages of cooked meat were then placed on a rack with the necks of the bags downward from the main chambers containing the meat. The temporary plastic covered soft wire clips were removed and the packaged juices and liquids allowed to flow into the necks of the bags. Two permanent or hermetic seals were then placed on each of the necks of the bags close to the meat chambers, close to each other, both clips being above the liquid level of the juices in the necks of the bags. By means of scissors, the meat containers and the liquid containers were severed, but without breaking any of the hermetic seals on either of the containers formed from each bag. By preserving the hermetic seals, the shelf life of the cooked beef was prolonged indefinitely. The total original weight of the beef was 58 lbs. After cooking and draining the unabsorbed juices from it, the beef totaled approximately 50 lbs. It had excellent flavor and was particularly appetizing, succulent and flavorful when heated in association with the juices originally drained from it at the time of the initial cooking. This same weight of beef cooked as seven pieces in an open kettle with moist heat yielded only 55% of its original weight, on a drained basis.

*Example II*

A warm solution consisting of 1½ oz. of gelatin, 4 oz. of monosodium glutamate, 15 grams of sodium isoascorbate and 42 fl. oz. of water was stitched in a plurality of places to the extent of about 3% of the total weight of the meat into a brisket of beef. The meat was then placed in a polyvinylidene chloride bag, along with seasoning, spices, and conventional corning brine (curing ingredients). The bag then had vacuum applied to it to remove as much air as possible and the bag was shrunk by conventional means. The meat was allowed to cure for 10 days at about 40° F. A temporary wire liquid seal was then placed on the elongated neck of the bag close to the meat chamber juncture, after which the meat was cooked in a tank of hot water at 160° F. for about 1 hour for each pound of meat. As in Example I, the packaged cooked corned beef was immediately chilled in an ice-water slurry to an internal temperature of about 35° F. The soft temporary wire clip was then removed and the unabsorbed juices drained into the neck of the bag by gravity. A permanent hermetic seal was then placed at the point where the temporary clip had been, after which the drained liquids were withdrawn from the rest of the sealed meat chamber by means of a knife or scissors, and discarded. The briskets originally weighed about 54½ lbs., after curing about 59 lbs. and after cooking and draining off the unabsorbed liquids, about 51 lbs. A similar piece of corned beef prepared in conventional manner as by soaking in a corning brine (curing ingredients) increased in weight by about 20%. When cooked in an open kettle, the shrinkage weight (drained) amounted to about 45 to 55% of its original uncorned weight.

*Example III*

Green, headless shrimp, weighing about 100 lbs. were stitched with a warm solution of 1.5 oz. of gelatin, 4 oz.

of monosodium glutamate and about 42.5 fluid oz. of water, to the extent of about 3% of their total weight and were then pealed and deveined. The prepared shrimp were then placed in a polyvinylidene chloride bag, the air removed by application of vacuum, the opening of the bag sealed and the bag shrunk. A temporary clip was placed at the juncture of the neck of the bag with the chamber containing the shrimp. The shrimp were cooked in a tank of hot water miantained at about 180° F. for about 35 minutes, followed immediately by a chilling in an ice-water slurry to about 35° F. Unabsorbed juices and liquids were drained by gravity into the elongated neck, after removal of the temporary clip. The drained shrimp were then sealed hermetically in the bag at the point approximately where the temporary clip had been, and the elongated neck of the bag now containing the unabsorbed juices and liquids was severed from the bag containing the hermetically sealed shrimp. The sealed, cooked, sterile shrimp weighed about 71 lbs., while the original shrimp weighed approximately 100 lbs.

The same 100 lbs. of shrimp placed in boiling water open to the atmosphere and cooked for the same length of time and at the same temperature produced on a drained basis a marketable yield of about 55% of their original weight and were less succulent and flavorful than those processed by the novel process herein described.

While the invention described with reference to certain specific fleshy foods, plastic packaging materials, techniques, and conditions for cooking, such details are illustrative only and are not set forth by way of limitation. Numerous modifications and equivalents other than those hereinbefore set forth will be readily apparent to those skilled in the art.

What is claimed is:

1. The process of preparing sterile, cooked, succulent, packaged, fleshy foods derived from animals, substantially free from associated unabsorbed liquids at room temperature, which comprises encasing the uncooked fleshy food in a plastic container which is heat stable at the cooking temperatures employed and is inert to the fleshy food being processed, said container having an elongated neck after encasing the fleshy food, applying a vacuum through an opening to exhaust at least a substantial amount of entrapped air, hermetically sealing the container while under vacuum at a point adjacent the point of vacuum application, subjecting the sealed container and its encased fleshy food to cooking temperatures for a sufficient length of time to at least partially cook the fleshy food, immediately chilling said encased food to a temperature of between about 33 and about 40° F., gravity draining liquids remaining unabsorbed in the cooked, chilled fleshy food into the elongated neck and applying at least one seal hermetically to the elongated neck, while the drained liquids remain in the neck portion by gravity, intermediate said juncture and the level of the drained liquid.

2. The process of preparing sterile, cooked, succulent, packaged, fleshy foods derived from animals, substantially free from associated unabsorbed liquids at room temperature, which comprises injecting into uncooked fleshy food an aqueous liquid comprising water, an edible gelling agent and a mono alkali metal salt of glutamic acid, while at a moderate superatmospheric temperature, said gelling agent being present in sufficient concentration to set the injected aqueous liquid at least to a semi-solid mass upon cooling to atmospheric temperature, encasing the injected uncooked fleshy food in a plastic container which is heat stable at the cooking temperatures employed and is inert to the fleshy food being processed, said container having an elongated neck after encasing the fleshy food, applying a vacuum through an opening to exhaust at least a substantial amount of entrapped air, hermetically sealing the container while under vacuum at a point adjacent the point of vacuum application, subjecting the sealed container and its encased fleshy food to cooking temperatures for a sufficient length of time to at least partially cook the fleshy food, immediately chilling said encased food to a temperature of between about 33 and about 40° F., gravity draining liquid remaining unabsorbed in the cooked, chilled fleshy food into the elongated neck sealed at a point removed from its juncture with the encased fleshy food, and applying at least one seal hermetically to the elongated neck, while the drained liquids remain in the neck portion by gravity, intermediate said juncture and the level of the drain liquid.

3. The process as in claim 2 wherein prior to cooking, the opening is part of the elongated neck and after initial sealing of the elongated neck, a temporary hermetic seal is applied to said neck adjacent said juncture, which seal is removed after completion of cooking and chilling, but prior to gravity draining the unabsorbed liquids into said elongated neck.

4. The process as in claim 3 wherein two additional hermetic seals are affixed to the elongated neck after cooking, chilling and draining, one being adjacent the juncture of said neck with said encased fleshy food and the other being applied between the point of applying said seal adjacent said juncture and the level of the drained liquid while in a gravity draining position.

5. The process as in claim 4 wherein after affixing the two said additional hermetic seals, that portion of said neck containing the drained liquid is severed from the sealed, encased, fleshy food portion at a point between the two said additional hermetic seals.

6. The process as in claim 2 wherein the injected aqueous liquid comprises water, monosodium glutamate and gelatin.

7. The process as in claim 3 wherein the injected aqueous liquid comprises water, monosodium glutamate and gelatin.

8. The process as in claim 4 wherein the injected aqueous liquid comprises water, monosodium glutamate and gelatin.

9. The process as in claim 2 wherein the injected aqueous liquid comprises water, monosodium glutamate, and gelatin and wherein the fleshy food is beef.

10. The process as in claim 3 wherein the injected aqueous liquid comprises water, monosodium glutamate, and gelatin and wherein the fleshy food is beef.

11. The process as in claim 4 wherein the injected aqueous liquid comprises water, monosodium glutamate, and gelatin and wherein the fleshy food is beef.

References Cited by the Examiner

UNITED STATES PATENTS

| 2,380,134 | 7/1945 | Waters | 99—182 |
| 2,687,961 | 8/1954 | Ellis | 99—107 |

FOREIGN PATENTS

| 222,877 | 7/1959 | Australia. |

A. LOUIS MONACELL, *Primary Examiner.*

L. M. SHAPIRO, *Assistant Examiner.*